United States Patent Office 2,837,503
Patented June 3, 1958

2,837,503
1,1,1-TRIFLUORO-3-TRIFLUOROMETHYL BUTENE-2 POLYMERS

Elizabeth S. Lo, Elizabeth, N. J., assignor, by mesne assignments, to Minnesota Mining and Manufacturing Company, St. Paul, Minn., a corporation of Delaware No Drawing. Application April 30, 1956
Serial No. 581,346

12 Claims. (Cl. 260—85.3)

This invention relates to halogen-containing polymeric compositions. In one aspect, the invention relates to polymeric composition of 1,1,1-trifluoro-3-trifluoromethyl butene-2. More particularly in this aspect, the invention relates to elastomeric, polymeric 1,1,1-trifluoro-3-trifluoromethyl butene-2 compositions and the method for their manufacture.

It is an object of this invention to provide new and useful halogen-containing polymeric compositions having desirable chemical and physical characteristics.

Another object of this invention is to provide new and useful polymeric compositions of 1,1,1-trifluoro-3-trifluoromethyl butene-2 compositions possessing elastomeric properties together with good chemical and physical characteristics, and which can be easily fabricated into a wide variety of useful articles of improved chemical and physical stability.

Still another object of this invention is to provide new and useful polymeric 1,1,1-trifluoro-3-trifluoromethyl butene-2 compositions serving as protective coatings having the aforementioned characteristics and which can be readily applied to the surfaces of a wide variety of useful articles.

A still further object of the invention resides in a process for obtaining these polymeric compositions in good yields.

Various other objects and advantages inherent in the invention will become apparent to those skilled in the art from the accompanying description and disclosure.

The monomer 1,1,1-trifluro-3-trifluoromethyl butene-2, from which the polymers of the present invention are produced, is prepared as follows:

Trifluoroisobutylene is reacted with trichlorobromomethane in the presence of benzoyl peroxide at about 100° C. for approximately 4 hours to produce the compound $CCl_3CH_2C(CF_3)BrCH_3$. This reaction is represented by the following equation:

(1) 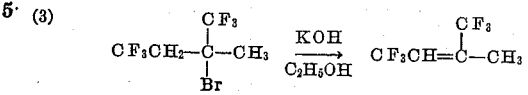

The compound $CCl_3CH_2C(CF_3)BrCH_3$ is next reacted with antimony trifluoride, in the presence of free chlorine at about 60° C. to produce the compound

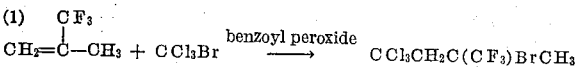

This reaction is represented by the following equation:

(2) 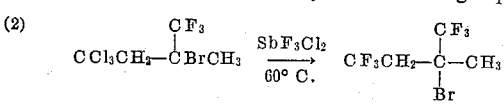

The compound

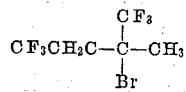

is then treated with potassium hydroxide dissolved in ethanol to produce the desired product 1,1,1-trifluoro-3-trifluoromethyl butene-2. This reaction is represented by the following equation:

(3) $$CF_3CH_2-\underset{\underset{Br}{|}}{\overset{\overset{CF_3}{|}}{C}}-CH_3 \xrightarrow[C_2H_5OH]{KOH} CF_3CH=\underset{}{\overset{\overset{CF_3}{|}}{C}}-CH_3$$

The monomer 1,1,1-trifluoro-3-trifluoro butene-2, produced in accordance with the above description, is found to have a boiling point of 31–31.5° C. and a molecular weight of 178.

In a preferred embodiment of the present invention, 1,1,1-trifluoro-3-trifluoromethyl butene-2 is copolymerized with a trifluoromethyl-1,3-butadiene, such as 1,1,3-trifluoro-1,3-butadiene or 2-trifluoromethyl-1,3-butadiene, under the conditions more fully hereinafter described, to produce elastomeric, polymeric compositions possessing improved chemical and physical stability, and increased resistance to oils, fuels and other strong chemical reagents. These polymeric products of 1,1,1-trifluoro-3-trifluoromethyl butene-2 with either 1,1,3-trifluoro-1,3-butadiene or 2-trifluoro-1,3-butadiene, constitute valuable macromolecules and are adaptable to a wide variety of commercial uses. They possess low temperature flexibility. In addition to the aforementioned properties of chemical and physical stability and resistance to oil and hydrocarbon fuels, they are also selectively soluble in various commercial solvents and serve as durable, flexible, protective coatings on surfaces which are subjected to environmental conditions in which they may come into contact with any of the aforementioned corrosive substances.

In general, as more fully hereinafter discussed, the polymeric compositions of the present invention are produced from the polymers of monomeric mixtures containing 1,1,1-trifluoro-3-trifluoromethyl butene-2 with either 1,1,3-trifluoro-1,3-butadiene or 2-trifluoromethyl-1,3-butadiene as a comonomer at a temperature between about −20° C. and about 150° C., with intermediate temperature ranges being selected with reference to the specific polymerization system employed. The most useful elastomeric polymeric compositions of the present invention are copolymers produced from monomeric mixtures containing between about 20 mole percent and about 75 mole percent 1,1,1-trifluoro-3-trifluoromethyl butene-2 and the remaining major constituent being either 1,1,3-trifluoro-1,3-butadiene or 2-trifluoromethyl-1,3-butadiene. The preferred elastomeric polymeric compositions of the present invention are copolymers produced from monomeric mixtures containing between about 25 mole percent and about 50 mole percent 1,1,1-trifluoro-3-trifluoromethyl butene-2 and the remaining major constituent being any of the aforementioned comonomers.

In producing elastomeric polymeric compositions from the aforementioned monomeric mixtures containing between about 20 mole percent and about 75 mole percent 1,1,1-trifluoro-3-trifluoromethyl butene-2 and the remaining major constituent being either of the aforementioned comonomers, it is found that the final elastomeric product contains between about 5 mole percent and about 50 mole percent 1,1,1-trifluoro-3-trifluoromethyl butene-2 and the remaining major constituent being either 1,1,3-trifluoro-1,3-butadiene or 2-trifluoromethyl-1,3-butadiene. In producing elastomeric copolymeric compositions from the aforementioned monomeric mixtures containing between about 25 mole percent and about 50 mole percent 1,1,1-trifluoro-3-trifluoromethyl butene-2 and the remaining major constituent being either of the aforementioned comonomers, it is found that the final elastomeric product contains between about 7 mole percent and about 40 mole percent 1,1,1-trifluoro-3-trifluoromethyl butene-2 and the remaining major constituent being any of the aforementioned comonomers.

The elastomeric polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e. g., perfluorooctanoic acid) or perfluorochlorocarboxylic acid salts (e. g., trifluorochloroethylene telomer acid soaps). The polyfluorocarboxylic acids which may be employed are such as those disclosed in U. S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slow-down or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and ditertiary butyl peroxide.

As previously indicated, the polymerization reaction is carried out, in general, at a temperature between about −20° C. and about 150° C. When the polymerization reaction is carried out employing a water-suspension type recipe, temperatures between about 5° C. and about 100° C. are preferably employed. When the polymerization reaction is carried out in the presence of an organic peroxide initiator in a bulk-type polymerization system, temperatures over the entire range of between about −20° C. and about 150° C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$)

bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the elastomeric copolymeric compositions of the present invention and are not to be construed as limiting its scope.

*Example 1*

A heavy walled glass polymerization tube of about 20 ml. capacity was flushed with nitrogen, evacuated at liquid nitrogen temperature and then charged with 1 ml. of a catalyst solution prepared by dissolving 0.4 gram of sodium metabisulfite in 20 ml. of water. The contents of the tube were then flushed and evacuated at liquid nitrogen temperature. Thereafter to the frozen contents of the tube were charged 4 ml. of a solution prepared by dissolving 1 gram of potassium persulfate in 80 ml. of water. The contents of the tube were then refrozen and evacuated at liquid nitrogen temperature. To the frozen contents of the tube were then charged 5 ml. of a solution prepared by dissolving 0.75 gram of perfluorooctanoic acid dissolved in 100 ml. of water and finally adjusting this solution to a pH of 10. The tube was next connected to a gas-transfer system and evacuated at liquid nitrogen temperature. To the frozen contents of the tube were added, by distillation 2.97 grams of 1,1,1-trifluoro-3-trifluoromethyl butene-2 and 2.03 grams of 1,1,3-trifluoro-1,3-butadiene which comprised a 47/53 molar ratio.

After the contents of the tube were thoroughly frozen with liquid nitrogen the tube was evacuated and sealed. The polymerization tube and the contents were then agitated in a temperature-regulated water-bath at 50° C. for a period of 22 hours. At the end of this time, the contents of the tube were coagulated by freezing. The coagulated product was then removed from the tube, washed with hot water and dried to constant in vacuo at 35° C. A rubbery copolymeric product was obtained which was found, upon analysis, to comprise 7 mole percent 1,1,1 - trifluoro - 3 - trifluoromethyl butene - 2, and the remaining major constituent 1,1,3-trifluoro-1,3-butadiene, being present in an amount of approximately 93 mole percent. The copolymer was obtained in an amount corresponding to a 20% conversion.

A sample of the raw copolymer was compression molded at 250° F. for a period of approximately 10 minutes. After molding the sample retained its rubbery characteristics. Gehman stiffness according to ASTM designation, D–1053–49 T, was as follows:

$T_2 = -6.9°$ C.   $T_{10} = -15.1°$ C.
$T_5 = -12.6°$ C.   $T_{100} = -22.3°$ C.

A volume increase of 14.1% was observed in the molded sample, when tested by ASTM designation, D–471–49 T, in ASTM type II fuel, consisting of isooctane (60% by volume), benzene (5% by volume), toluene (20% by volume) and xylene (15% by volume).

*Example II*

Employing the procedure set forth in Example I and the same polymerization system, the tube was charged with 2.82 grams of 1,1,1-trifluoro-3-trifluoromethyl butene-2 and 2.18 grams of 2-trifluoromethyl-1,3-butadiene which comprised a comonomer mixture containing 47 mole percent 1,1,1-trifluoro-3-trifluoromethyl butene-2 and 53 mole percent of 2-trifluoromethyl-1,3-butadiene. The polymerization reaction was carried out at a temperature of 50° C. for a period of 22 hours. The resultant elastomeric product was worked-up in accordance with the same procedure as set forth in Example I. A rubbery product was obtained and, upon analysis, was found to comprise approximately 15 mole percent 1,1,1-trifluoro-3-trifluoromethyl butene-2 and 85 mole percent 2 - trifluoromethyl - 1,3 - butadiene. The copolymer was obtained in an amount corresponding to a 28% conversion.

A sample of the raw copolymer was compression molded at 150° F. for a period of approximately 10 minutes. After molding it was found that the sample retained its rubbery characteristics and was flexible at a temperature of as low as —29.9° C.

*Example III*

The procedure set forth in Example I was repeated, and the same catalyst system was employed, except that the potassium salt of the $C_8$-telomer acid,

$CF_2Cl(CFClCF_2)_3COOH$ was substituted for the perfluorooctanoic acid of Example I in a similar amount of 0.75 gram. The polymerization tube was charged with 1.51 grams of 1,1,1-trifluoro-3-trifluoromethyl butene-2 and 3.49 grams of 2 - trifluoromethyl - 1,3 - butadiene which comprised a comonomeric mixture containing 22.9 mole percent of 1,1,1-trifluoro-3-trifluoromethyl butene-2 and 77.1 mole percent of 2-trifluoromethyl-1,3-butadiene.

The polymerization reaction was carried out at a temperature of 50° C. for a period of 22 hours. The resultant elastomeric product was worked-up in accordance with the same procedure as set forth in Example I. This rubbery product, upon analysis, was found to comprise approximately 10 mol percent 1,1,1-trifluoro-3-trifluoromethyl butene-2 and the remaining major constituent 2-trifluoromethyl-1,3-butadiene being present in an amount of approximately 90 mole percent. The copolymer was obtained in an amount corresponding to a 54% conversion.

A sample of the raw copolymer was compression molded to 150° F., for a period of approximately 10 minutes. After molding, it was found that the sample retained its rubbery characteristics and was flexible at a temperature of as low as —28.8° C.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the polymeric compositions of the present invention reside in the fabrication of belting, hose, mountings, pistol and pump-valves, sheet and valve-disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. A process for preparing a polymeric composition which comprises polymerizing a monomeric mixture of 1,1,1-trifluoro-3-trifluoro-3-trifluoromethyl butene-2 and a trifluoro-1,3-butadiene selected from the group consisting of 1,1,3-trifluoro-1,3-butadiene and 2-trifluoromethyl-1,3-butadiene at a temperature between about —20° C. and about 150° C.

2. A process for preparing a polymeric composition which comprises polymerizing a monomeric mixture of 1,1,1-trifluoro-3-trifluoromethyl butene-2 and 1,1,3-trifluoro-1,3-butadiene at a temperature between about —20° C. and about 150° C.

3. A process for preparing a polymeric composition which comprises polymerizing a monomeric mixture of 1,1,1-trifluoro-3-trifluoromethyl butene-2 and 2-trifluoromethyl-1,3-butadiene at a temperature between about —20° C. and about 150° C.

4. A process for preparing a polymeric composition which comprises a monomeric mixture of 1,1,1-trifluoro-3-trifluoromethyl butene-2 and a trifluoro-1,3-butadiene selected from the group consisting of 1,1,3-trifluoro-1,3-butadiene and 2-trifluoromethyl-1,3-butadiene, said mixture containing between about 20 mole percent and about 75 mole percent 1,1,1-trifluoro-3-trifluoromethyl butene-2 and correspondingly between about 80 mole percent and about 25 mole percent of trifluoro-1,3-butadiene, at a temperature between about −20° C. and about 150° C.

5. A process for preparing a polymeric composition which comprises a monomeric mixture of 1,1,1-trifluoro-3-trifluoromethyl butene-2 and 1,1,3-trifluoro-1,3-butadiene, said mixture containing between about 20 mole percent and about 75 mole percent 1,1,1-trifluoro-3-trifluoromethyl butene-2 and correspondingly between about 80 mole percent and about 25 mole percent 1,1,3-trifluoro-1,3-butadiene, at a temperature between about −20° C. and about 150° C.

6. A process for preparing a polymeric composition which comprises a monomeric mixture of 1,1,1-trifluoro-3-trifluoromethyl butene-2 and 2-trifluoromethyl-1,3-butadiene, said mixture containing between about 20 mole percent and about 75 mole percent 1,1,1-trifluoro-3-trifluormethyl butene-2 and correspondingly between about 80 mole percent and about 25 mole percent 2-trifluoromethyl-1,3-butadiene, at a temperature between about −20° C. and about 150° C.

7. A process for preparing a polymeric composition which comprises a monomeric mixture of 1,1,1-trifluoro-3-trifluoromethyl butene-2 and a trifluoro-1,3-butadiene selected from the group consisting of 1,1,3-trifluoro-1,3-butadiene and 2-trifluoromethyl-1,3-butadiene, said mixture containing between about 25 mole percent and about 50 mole percent 1,1,1-trifluoro-3-trifluoromethyl butene-2 and correspondingly between about 75 mole percent and about 50 mole percent of the trifluoro-1,3-butadiene, at a temperature between about −20° C. and about 150° C.

8. A process for preparing a polymeric composition which comprises a monomeric mixture of 1,1,1-trifluoro-3-trifluoromethyl butene-2 and 1,1,3-trifluoro-1,3-butadiene, said mixture containing between about 25 mole percent and about 50 mole percent 1,1,1-trifluoro-3-trifluoromethyl butene-2 and correspondingly about between 75 mole percent and about 50 mole percent 1,1,3-trifluoro-1,3-butadiene, at a temperature between about −20° C. and about 150° C.

9. A process for preparing a polymeric composition which comprises a monomeric mixture of 1,1,1-trifluoro-3-trifluoromethyl butene-2 and 2-trifluoromethyl-1,3-butadiene, said mixture containing between about 25 mole percent and about 50 mole percent 1,1,1-trifluoro-3-trifluoromethyl butene-2 and correspondingly between about 75 mole percent and about 50 mole percent 2-trifluoromethyl-1,3-butadiene, at a temperature between about −20° C. and about 150° C.

10. A copolymer of 1,1,1-trifluoro-3-trifluoromethyl butene-2 and a trifluoro-1,3-butadiene selected from the group consisting of 1,1,3-trifluoro-1,3-butadiene and 2-trifluoromethyl-1,3-butadiene.

11. A copolymer of 1,1,1-trifluoro-3-trifluoromethyl butene-2 and 1,1,3-trifluoro-1,3-butadiene.

12. A copolymer of 1,1,1-trifluoro-3-trifluoromethyl butene-2 and 2-trifluoromethyl-1,3-butadiene.

References Cited in the file of this patent

UNITED STATES PATENTS 2,490,753   Hill et al. _____ Dec. 6, 1949

FOREIGN PATENTS 496,279   Canada _____ Sept. 22, 1953

OTHER REFERENCES

Adams et al.: Journal of Polymer Science, vol. IX, No. 6, December 1942, pages 491–492.

Prober: Jour. Amer. Chem. Soc., vol. 72, February 1950, pages 1036 and 1037.